May 6, 1952 G. PASCOE 2,595,604
WHEEL ALIGNING DEVICE
Filed July 8, 1949 2 SHEETS—SHEET 1
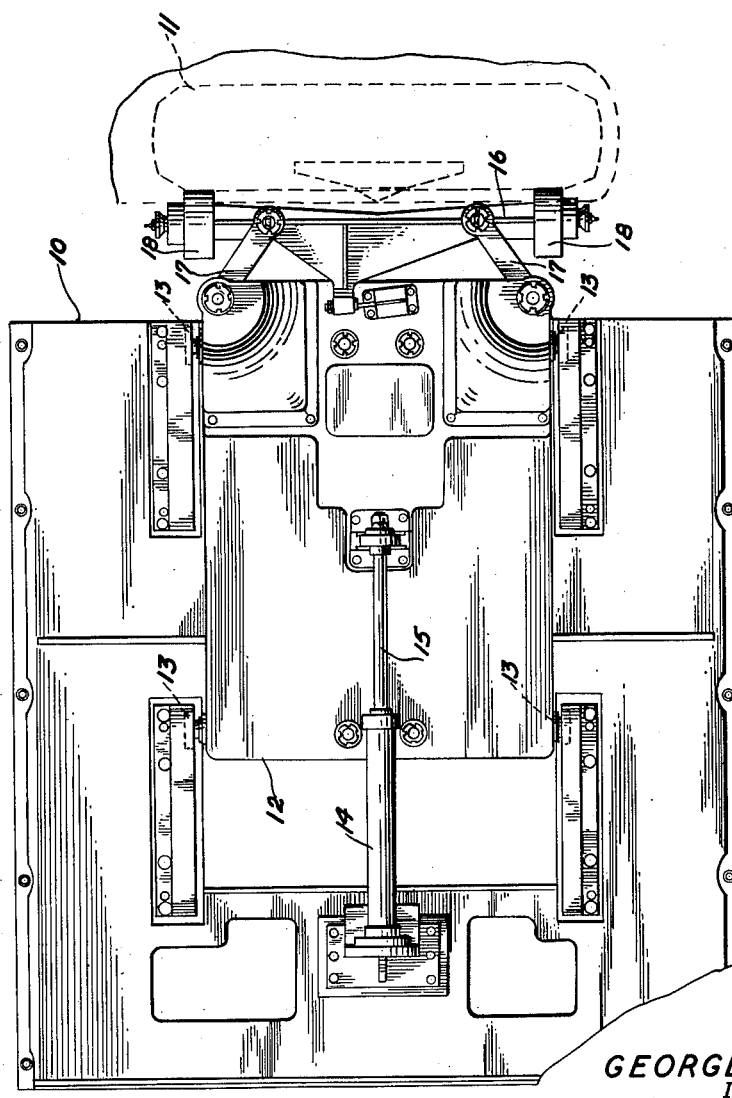
GEORGE PASCOE
INVENTOR.
BY E. C. McRae
J. R. Faulkner
T. H. Oster
ATTORNEYS May 6, 1952     G. PASCOE     2,595,604
WHEEL ALIGNING DEVICE
Filed July 8, 1949     2 SHEETS—SHEET 2
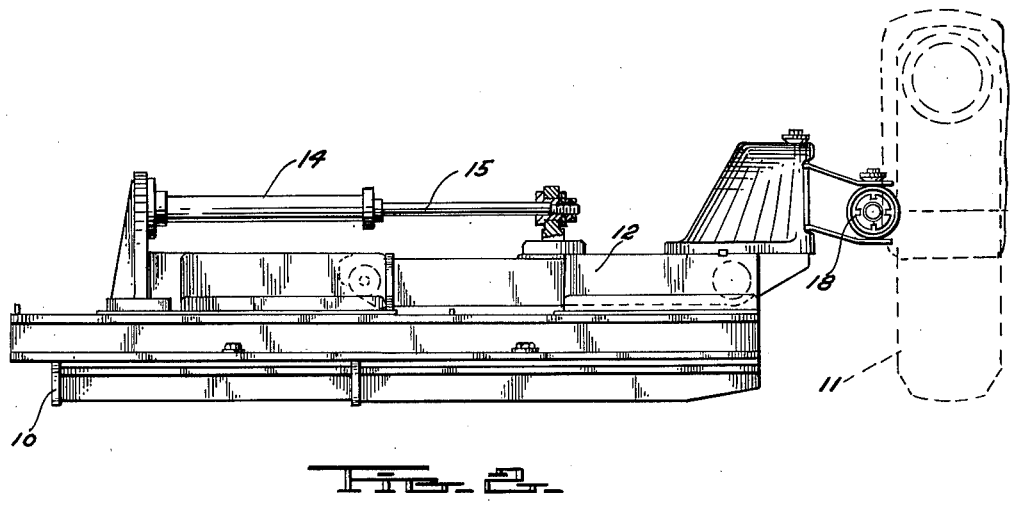
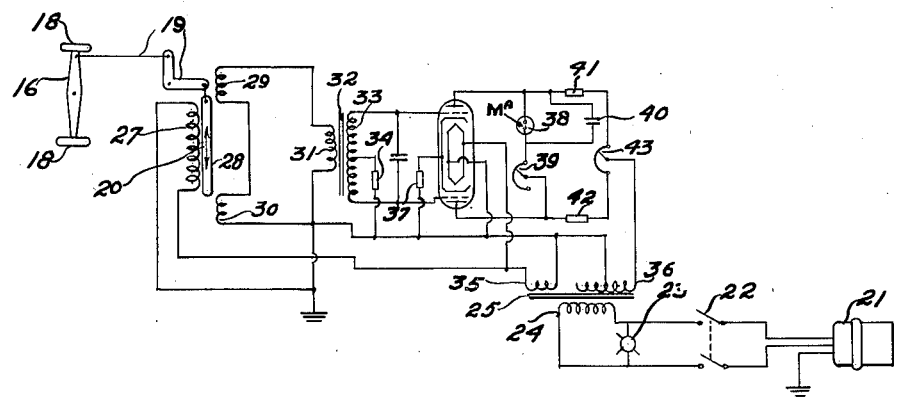
GEORGE PASCOE
INVENTOR.
BY
ATTORNEYS Patented May 6, 1952

2,595,604

UNITED STATES PATENT OFFICE 2,595,604

WHEEL ALIGNING DEVICE

George Pascoe, Detroit, Mich., assignor to Ford Motor Company, Dearborn, Mich., a corporation of Delaware Application July 8, 1949, Serial No. 103,568

2 Claims. (Cl. 33—203.12)

This invention is directed to a wheel aligning device and more particularly to an apparatus in which irregularities in the wheel being aligned will not adversely affect the operation of the device. This apparatus has been designed primarily to permit the rapid and accurate determination of the correct amount of toe-in upon the front wheels of a motor vehicle and to do so despite the inevitable irregularities which are present in the pneumatic tires mounted upon such wheels.

Accordingly, the object of this invention is to provide a means for quickly and accurately determining the toe-in of automotive dirigible wheels.

A further object of this invention is to provide a toe-in measuring device which is capable of measuring the toe-in around the entire periphery of the wheel and automatically integrating tire irregularities.

With these and other objects in view, this invention consists in the arrangement, combination and construction of the various parts of my improved device as described in the accompanying specification, claimed in the claims, and illustrated in the attached drawings in which:

Figure 1 is a plan view of the invention with a portion of an automobile wheel shown in phantom.

Figure 2 is a side elevation of the device again with a portion of the automotive wheel shown in phantom.

Figure 3 is a circuit diagram of the electrical indicating device employed in conjunction with the apparatus shown in Figures 1 and 2.

In Figure 1 the base upon which the device is located is indicated at 10. The automotive wheel, the toe-in of which is to be measured is indicated in phantom at 11. Carriage 12 is mounted upon rollers 13 so that it is capable of movement from left to right on base 10. Movement of carriage 12 on base 10 is effected by hydraulic or pneumatic cylinder 14, in which piston rod 15 is operated. Piston rod 15 is in turn securely attached to carriage 12. The portion of carriage 12 adjacent wheel 11 is provided with a quadrilateral linkage. Bar 16 comprises the side of this quadrilateral linkage adjacent and parallel to the wheel to be measured. The edge of carriage 12 adjacent wheel 11 provides another side of the quadrilateral linkage which is arranged parallel to the wheel to be measured. Arms 17 serve to pivotally connect bar 16 and the carriage 12. Arms 17 are provided with vertical bearings at either end to permit movement of the entire quadrilateral linkage.

Actual contact with the wheel to be measured is made through rollers 18 which are mounted upon each end of bar 16.

The arrangement of the device shown in Figure 1 can perhaps be more easily understood by consideration of Figure 2 of a drawing which is a side elevation of the apparatus. Here it can be seen that rollers 18 contact the periphery of the tire upon a horizontal line passing through the axis of the wheel. In this manner any given amount of toe-in or toe-out of the wheel 11 will be reflected in a definite position of the quadrilateral linkage.

In the use of this device the motor vehicle upon which the adjustment of the front wheels is to be made is placed in a definite and predetermined position with the axis of the wheel to be measured coinciding with the mid-point of the quadrilateral linkage. The device upon which the motor vehicle is mounted for measurement is arranged to rapidly rotate both front wheels.

It is to be understood, of course, that the apparatus depicted in Figures 1 and 2 is normally provided in duplicate with a complete apparatus arranged to co-act with each of the front wheels to be measured.

Figure 3 is a diagram of an electric circuit which may be employed to automatically and continuously indicate the position assumed by the wheel while its position is being measured and adjusted. Again in Figure 3 the numeral 16 designated the bar which parallels the wheel being measured and carries at either end rollers 18. A linkage 19 is shown diagrammatically connecting one end of bar 16 with transformer 20. The entire indicating device is energized from power source 21 and controlled by switch 22. It is to be understood that power source 21 will be alternating current of a usual commercial voltage and frequency. Pilot lamp 23 is provided to indicate the fact that energy is being supplied to the indicating device. Primary coil 24 of transformer 25 receives energy needed to operate this machine. Secondary coil 35 of transformer 25 is connected directly to primary coil 27 of transformer 26. Transformer 20 is provided with an axially movable core 28 which in turn is arranged to be shifted axially by linkage 19 and bar 16. Transformer 20 is provided with secondary coils 29 and 30 one of which is arranged adjacent each end of movable core 28. Secondary coils 29 and 30 are connected with opposite polarities to primary coil 31 of transformer 32. With this arrangement and with movable core 28 positioned between secondary coils 29 and 30 each of these secondary coils will generate an equal and opposite electromotive force and there will be no tendency for any current to flow in primary 31 of transformer 32. However, any axial movement of movable core 28 will result in an unbalance so that the electromotive forces generated in secondary coils 29 and 30 will not be equal and opposite and current will tend to flow through primary coil 31 of transformer 32. The flow of current through primary coil 31 of transformer 32 will, of course, result in the generation of an electromotive force in secondary coil 33 of transformer 32. This secondary coil 33 of transformer 32 is center tapped and connected at this center tap through resistor 34 having a typical value of 470 ohms to one of the leads of secondary coil 30 of transformer 26. The ends of secondary coil 33 of transformer 32 are directly connected to the grids of a double triode tube which may be conveniently one known commercially as 6N7GT/G. The filament of the double triode is heated by the secondary coil 35 upon transformer 25. The plate potential for this double triode is provided by secondary coil 36 on transformer 25. Resistor 37 is connected to the tube filament and one end of secondary coil 30 of transformer 22 and provides some bias for the tube. This resistor can conveniently have a value of about 500 ohms. The plate circuit which is supplied with energy by separate secondary coil 36 on transformer 25 is designed to operate indicating milliameter 38 which is arranged with the zero point in the center of the scale. Potentiometer 39 is placed in the meter circuit to regulate the sensitivity of this instrument. Milliameter 38 is shunted by capacitor 40 for a purpose which will be described shortly. Capacitor 40 should have a capacity of about 500 microfarads. Resistors 41 and 42 are inserted in the circuit as shown. Resistor 41 should have a value of about 10,000 ohms and a similar value will be found suitable for resistor 42. Potentiometer 43 is inserted in the plate circuit and serves to balance the system.

From a study of the above diagram it can be seen that a position of the potentiometer 43 and movable core 28 can be selected so that no current will flow through milliameter 38 and the needle of milliameter 38 will remain upon the center of the scale. An axial movement of movable core 28 will, as explained above, cause an unbalance between secondary coils 29 and 30 of transformer 20 and cause the triode to conduct from the filament to one of the two grids, the direction of the conduction being, of course, dependent upon the direction of the unbalance in transformer 20. Using only one double triode, as illustrated in Figure 3 this conduction occurs for only one-half of each cycle of the alternating current circuit from which the instrument is powered. However, this has not been found objectionable since these alternations are too rapid to be objectionable and are effectively integrated by the instrument. Due to the irregularities present in the side walls of tires, it has been found to be necessary to rotate the wheel to obtain an accurate measure of toe-in or toe-out. Due to the inherent instantaneous response of the electronic circuit indicated, it has been found that there was a tendency for milliameter 38 to follow these irregularities as the wheel revolved and hence render an accurate reading impossible. It has been found to be impracticable to rotate the wheels fast enough to cause the milliameter 38 to integrate these irregularities. To avoid these difficulties capacitor 40 of the relatively large capacity has been shunted across milliameter 38 to serve to dampen out these undesired fluctuations and to give a steady integrated reading despite gross irregularities in the tire side walls mounted upon the wheel to be measured.

It is thought that from the above description, the operation of the device will be readily understood. When the motor vehicle has been placed in position for adjusting the front wheels and rotation has been imparted to the wheels, carriage 12 carrying the measuring apparatus is caused to move to the right by hydraulic or pneumatic means 14 so that rollers 18 are firmly in contact with the tires. The toe-in or toe-out of the wheel is now accurately reflected in the reading of milliameter 38 which is calibrated in terms of acceptable and unacceptable toe-in or toe-out. With the guidance of the meter the toe-in or toe-out of the wheels is corrected simultaneously for both front wheels by using double machines. As explained above, no difficulty is experienced from tire irregularities by virtue of the dampening imparted to milliameter 38 by capacitor 40.

When the correct adjustment has been secured, the carriage 12 is retracted away from the wheel by means of cylinder 14. In this way the bar 16 and associated rollers 18 do not interfere with the removal of the completed vehicle from the apparatus and the positioning of the next succeeding vehicle.

I claim as my invention:

1. A wheel toe-in measuring device for measuring the toe-in of a rotating vehicular wheel upon which is mounted a pneumatic tire comprising a roller adapted to rest upon the side wall of the tire at a location ahead of the wheel axis, another roller adapted to rest upon the side wall of the tire at a location behind the wheel axis and an electrical device connected to the rollers by a mechanical linkage and adapted to continuously indicate the toe-in of the rotation wheel, said electrical device including a transformer having two balanced secondary coils and a movable core connected to said linkage, the output of said balanced secondary coil being registered upon an indicating meter, the oscillations of said meter being damped by a condenser shunted across said meter.

2. The structure recited in claim 1 in which the output of the secondary coils are connected across the primary of another transformer so that the voltages generated by said coils are opposed and in which the output of the last-mentioned transformer is employed to energize the indicating meter the oscillations of which are damped by the condenser shunted across said meter.

GEORGE PASCOE.

REFERENCES CITED

The following references are of record in the file of this patent:

UNITED STATES PATENTS

| Number | Name | Date |
|---|---|---|
| 2,076,347 | Morse et al. | Apr. 6, 1937 |
| 2,266,224 | MacMillan | Dec. 16, 1941 |
| 2,289,074 | Rushing et al. | July 7, 1942 |